United States Patent [19]

Kramb

[11] 4,212,485

[45] Jul. 15, 1980

[54] MEDICAL SERVICE EQUIPMENT FOR MOTORCYCLES

[76] Inventor: Keneth D. Kramb, 3506 East Shore Dr., Kalamazoo, Mich. 49002

[21] Appl. No.: 5,316

[22] Filed: Jan. 22, 1979

[51] Int. Cl.² .............................. B62J 5/16; B62J 7/04
[52] U.S. Cl. ..................................... 280/766; 224/31; 224/32 A; 280/289 A
[58] Field of Search ..................... 224/32 R, 32 A, 31, 224/30 R, 30 A, 39, 42.11, 42.43, 273; 280/766, 304, 293, 286 H, 289 A, 202, 289 R

[56] References Cited

U.S. PATENT DOCUMENTS

| | | | |
|---|---|---|---|
| 600,364 | 3/1898 | Hill | 224/32 A |
| 1,163,592 | 12/1915 | Ferella | 280/304 X |
| 2,171,042 | 8/1939 | Minton | 280/304 UX |
| 2,837,312 | 6/1958 | Troche | 280/766 X |
| 3,362,596 | 1/1968 | Bostwick | 224/31 |
| 3,788,532 | 1/1974 | Bish | 224/32 A X |

FOREIGN PATENT DOCUMENTS

| | | | |
|---|---|---|---|
| 370158 | 4/1939 | Italy | 224/32 A |
| 114592 | 7/1945 | Sweden | 224/32 A |
| 25334 | of 1898 | United Kingdom | 224/32 A |
| 683628 | 12/1952 | United Kingdom | 224/31 |

Primary Examiner—Jerold M. Forsberg
Attorney, Agent, or Firm—Austin A. Webb

[57] ABSTRACT

A pair of rectangular metal side cases are attachable to opposite sides of the rear fork of a motor cycle and have side opening doors. A top case is attached to the frame of the cycle in bridging relation across the tops of the side cases and has a top opening lockable lid. A pair of smaller cases with front opening doors are arranged along the sides of the top case and in flash relation with the outer sides of the side cases. A pair of hydraulic jacks are mounted vertically on the front walls of the side cases, and an hydraulic pump is attached to the inner side of one of the side cases and connected to actuate the jacks. An electrical control panel mounted inside the front wall of one side case has connections adapted to be connected to the battery of the cycle and to the motor of the pump and to emergency signals and communication equipment on the cycle and the cases with control switches external to the case. Three metal panels form walls that are common to two or more of the cases. A tubular splint case is connected across the rear of the other cases.

6 Claims, 7 Drawing Figures

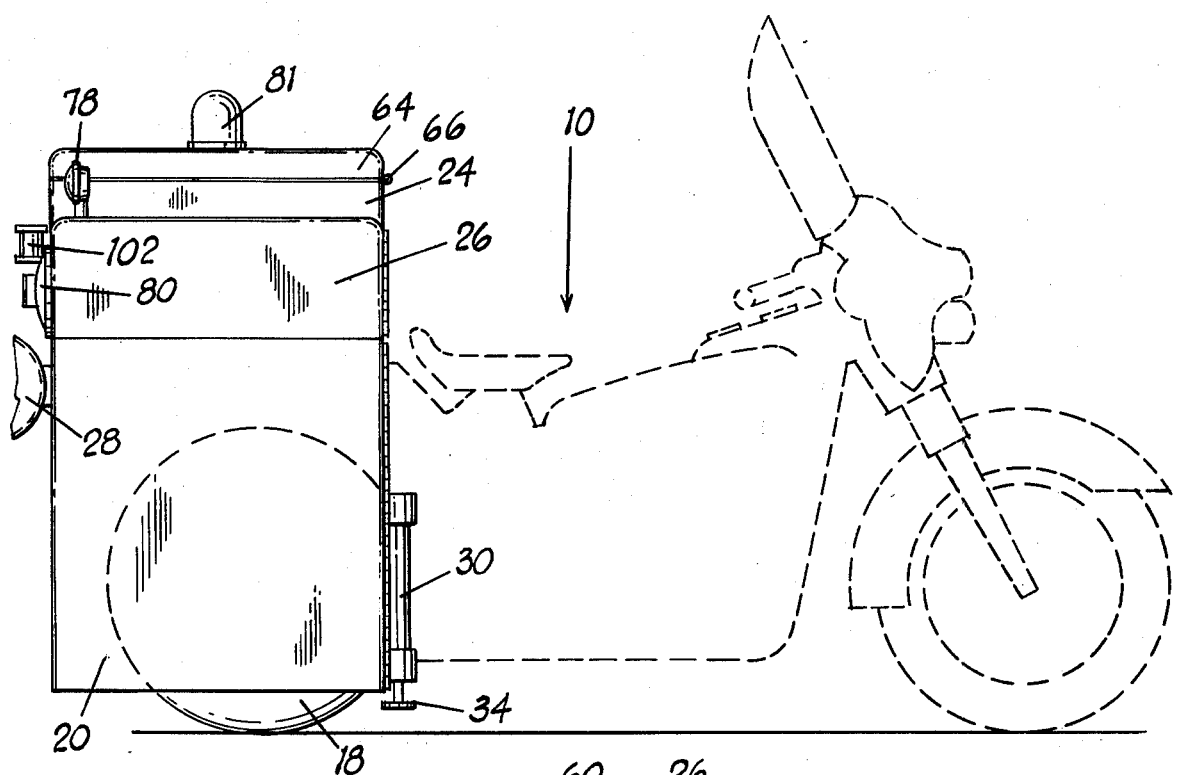
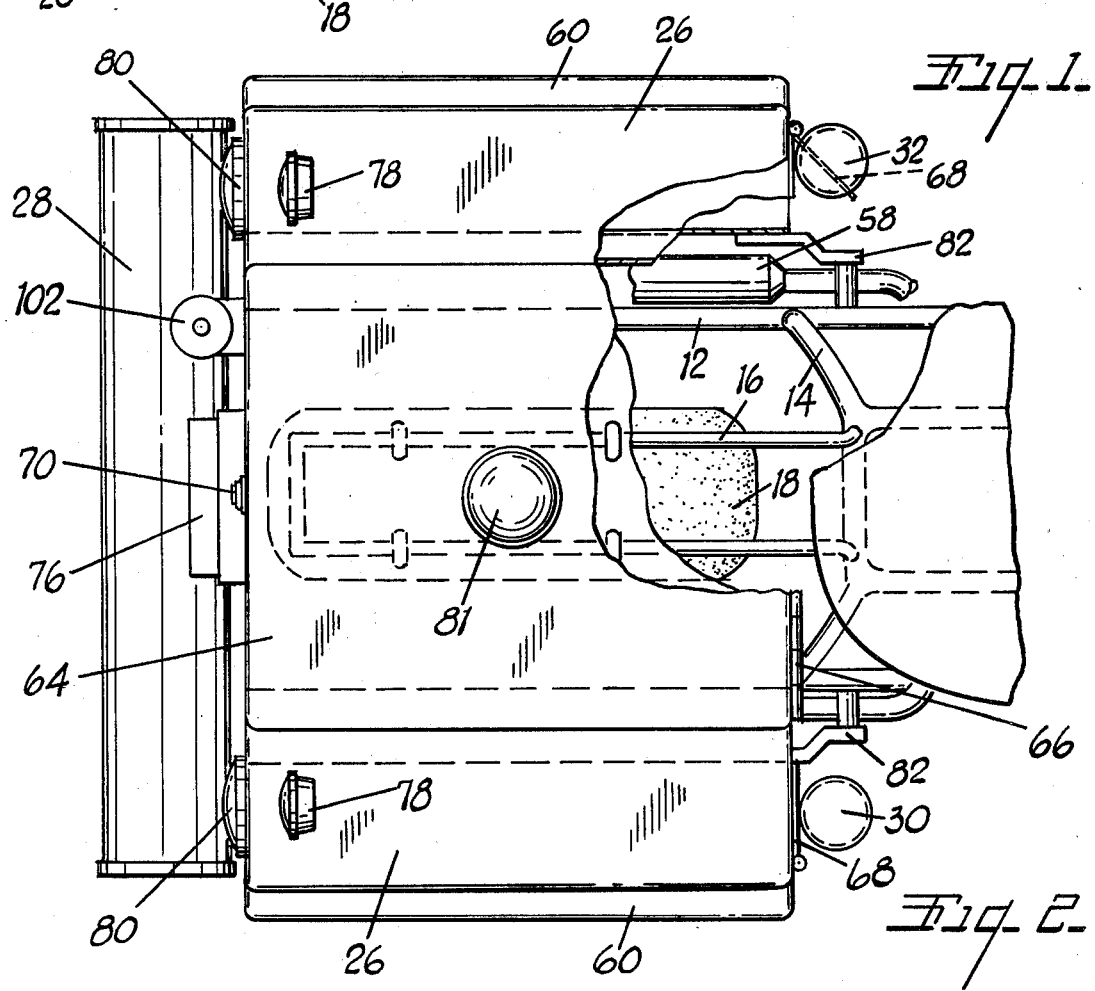

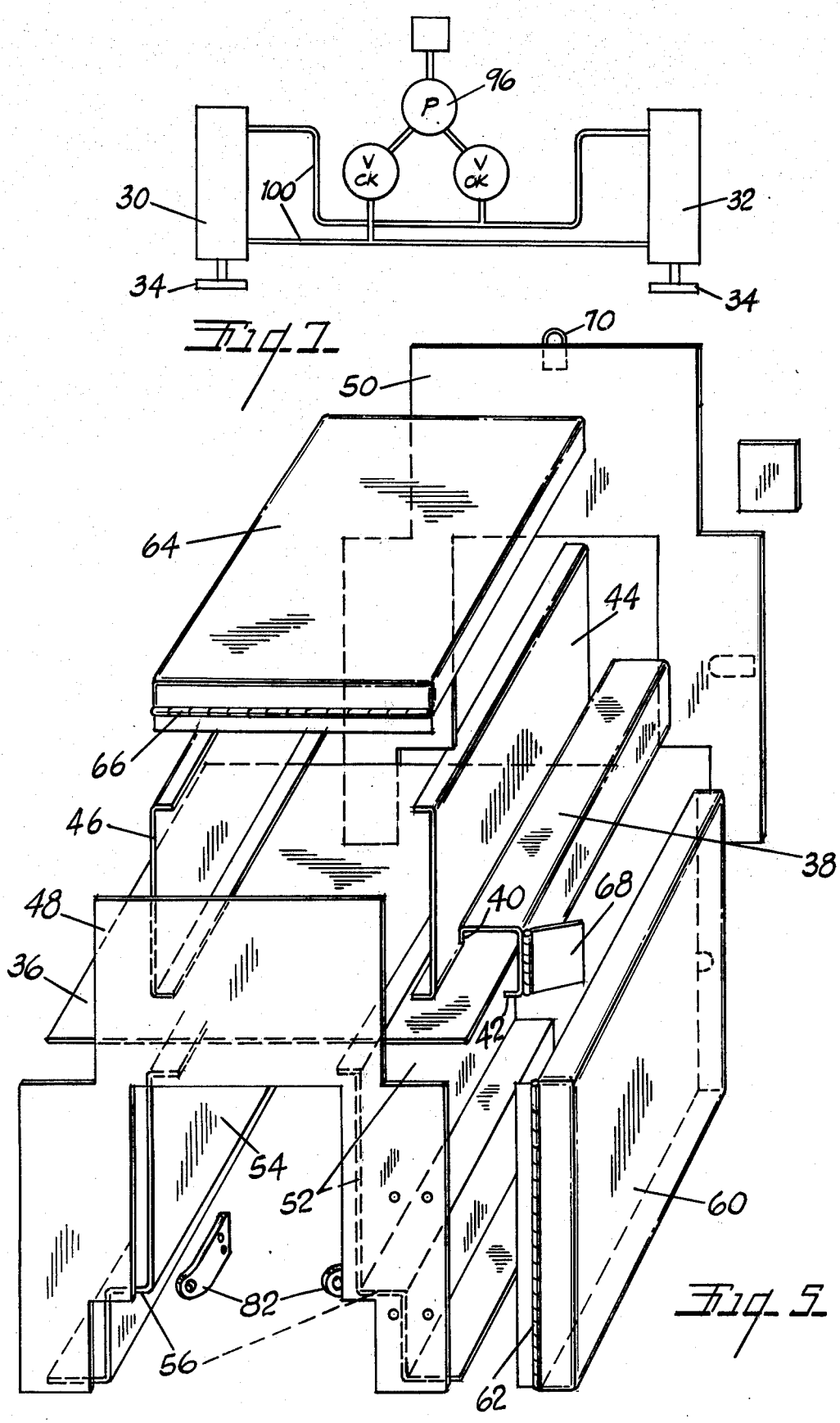

MEDICAL SERVICE EQUIPMENT FOR MOTORCYCLES

OUTLINE OF INVENTION

Motorcycles with cases for communication equipment such as radios are old. The present invention provides cases attachable to a standard motorcycle for enclosing additional electrical equipment plus sufficient medical equipment and supplies for rendering emergency first aid to accident victims by para-medic personnel. The cases also support hydraulic jacks and actuating equipment for holding the loaded cycle upright when unattended.

DETAILED DESCRIPTION

The drawings, of which there are 4 sheets, illustrate a preferred form of the equipment operatively installed on a motor cycle.

FIG. 1 is a side elevational view of a motorcycle with the equipment in place thereon.

FIG. 2 is an enlarged top plan view of the equipment, with parts broken away.

FIG. 5 is an exploded perspective view showing the major structural panels of the equipment.

FIG. 7 is a schemic diagram of the hydraulic connections of the pump and jacks of the equipment.

Figure 3:
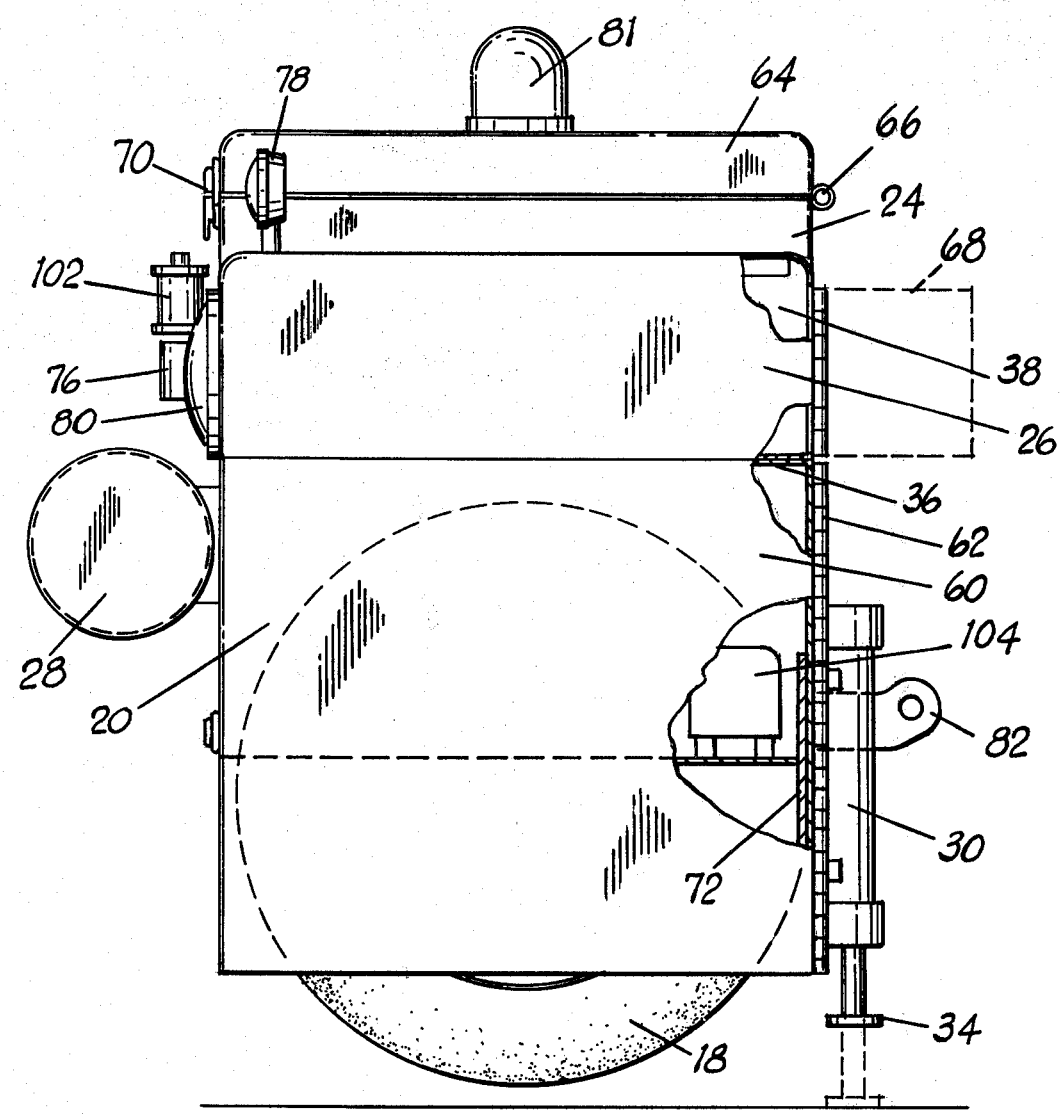
FIG. 3 is another enlarged right side elevational view of the equipment with parts broken away.

The motorcycle indicated generally at 10 has rear fork frame members including longitudinal lower members 12, inclined side members 14 and upper longitudinal members 16 spanning the rear wheel 18 and fender of the cycle. The cases or enclosures for the equipment of the invention include a right side case 20, left side case 22, a main top case 24 and two upper side cases 26. A further case including a transversely extending tube 28 is desirably connected across the rear ends of the lower side cases 20 and 22. A pair of upright hydraulic cylinders 30 and 32 are connected to the front walls of the lower side cases and function to raise and lower transversely spaced jack stands 34 for holding the cycle upright when unattended, as will be described in greater detail presently.

As appears more clearly in FIG. 5, a main flat panel 36 secured to the tops of the wheel bridging frame members 16 forms the bottoms of the main top case 24 and the two side top cases 26. It also forms the top walls of the main side cases 20 and 22. The upper side cases 26 are formed by inverted L-shaped metal panels 38 with attaching flanges 40 and 42 along the ends of their arms or branches. Side panels 44 and 46 which are common to the main top case 24 and the smaller side top cases 26 and project above the latter are secured to bottom plate 36 and the angled side panels 38. Two identical end panels 48 and 50 close the ends of the larger compartments or cases. Two inner side panels 52 and 54 complete the lower side cases 20 and 22. These have lateral off-sets at 56 which provide for clearance for the exhaust pipes 58 of the cycle. Doors 60 with piano type hinges 62 close the lower side cases 22 and 24. A top door 64 and hinge 66 close the main top case. Doors 68 close the front ends of the upper side cases. A locking hasp 70 holds the top cover closed.

The front end walls of the lower side cases are reinforced by metal plates 72 and have the hydraulic cylinders 30 and 32 connected thereto. Jack or support feet 34 are extensible and retractable from the cylinders, to hold the cycle upright. The connections and controls for the cylinders will be described presently. The standard tail and stop light 76 of the cycle is moved to the rear wall of the main equipment case. The rear turn signal lights 78 are transferred to the tops of the upper side cases. Flashing strobe signal lights 80 are mounted on the rear end walls of the upper side cases. A 360° rotating red signal light 81 and housing is mounted on the top cover or door 64.

The inner side walls or panels 52 and 54 carry mounting brackets 82 which project forwardly for attachment to the rear foot rest bracket of the cycle. Since the cycle will not carry a rear seat the original foot rests are removed. The brackets 82 will vary slightly between equipment cases for different brands or makes of cycles, but otherwise the case assemblies are the same. The bottom panel can easily be clamped to the bridging frame members of any cycle.

Figure 4:
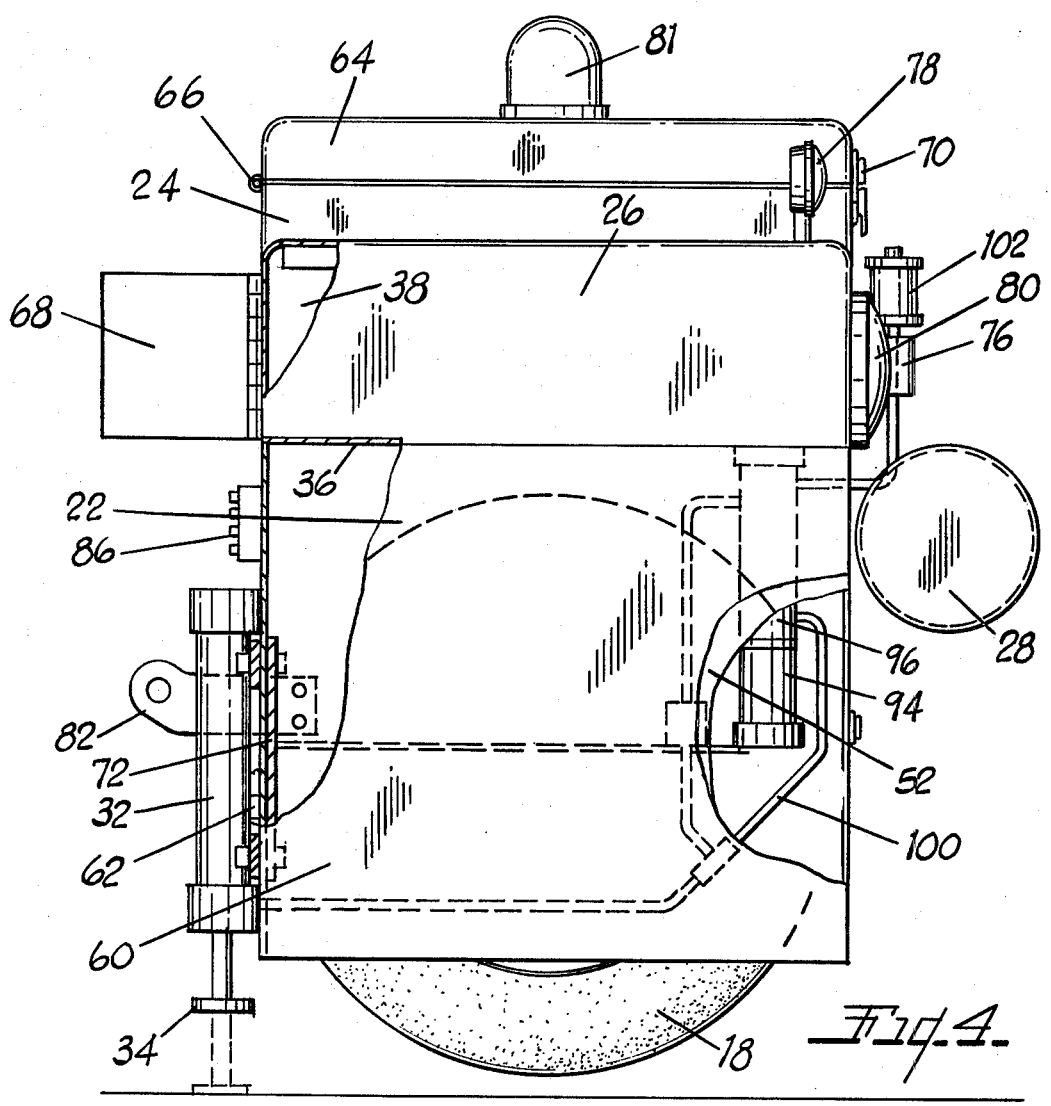
FIG. 4 is an enlarged side elevational view of the left side of the equipment with parts broken away.
Figure 6:
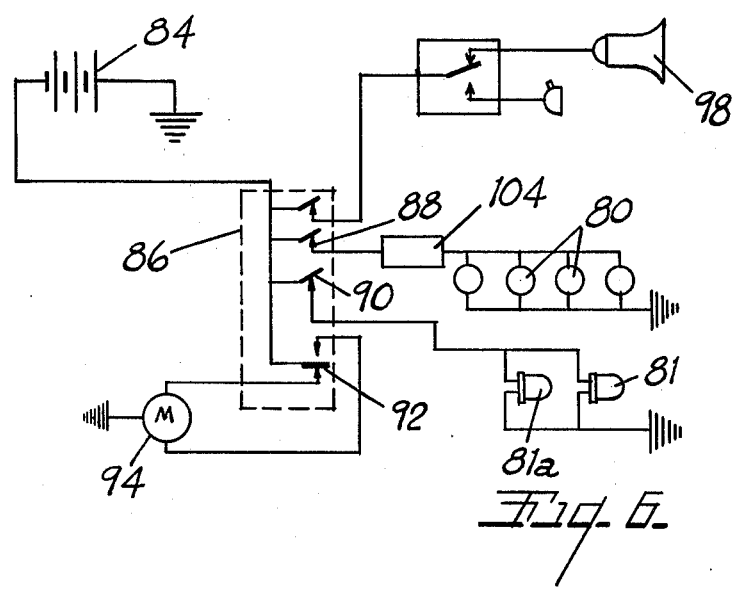
FIG. 6 is a schematic diagram of the electrical system of the equipment.

With particular reference to the wiring diagram in FIG. 6 and FIG. 4, it will be noted that a releasable coupling is carried on the front wall of the left side case for connecting the battery 84 of the cycle to various signal and communication components of the cycle attachment. A multiple terminal and switch panel 86 carries a first switch 88 for controlling the strobe lights 80 (and front facing strobe lights if they are used). A second switch 90 controls the center flashing lights 81 and 81a. A third switch 92 controls a battery driven motor 94 which is connected to a pump 96 for selectively and oppositely actuating the hydraulic cylinders 30 and 32.

Other signal devices such as a two-way radio, siren and public address speaker 98 have control elements not illustrated which are mounted on the handle bars of the cycle. Other emergency equipment, not stored in the several cases, may include a small fire extinguisher, hand axe and recharging socket for a hand flashlight.

With reference to the hydraulic diagram in FIG. 7, and the other figures, it will be seen that the hydraulic pump 96 and its driving motor 94 are mounted on the laterally inner side of the lower side panel 52. Hydraulic connecting pipes 100 connect the pump to the cylinders as will be understood. A filler tube and sight gauge 102 for the hydraulic system is mounted on the rear wall of the assembly. Since the strobe lights 80 require a transformer 104 which is not weatherproof, the transformer is mounted within the left side case.

No attempt has been made to illustrate the contents of the several cases. The cases are large enough to carry a complete set of medical drugs and emergency life saving equipment; as well as emergency tools such as ropes, cutters and a small sledge for freeing victims of accidents. The tubular case 28 is designed to hold a stretcher. The lock on the upper case is for protection of drugs and expensive medical equipment in the case. Locks may be provided on other cases as desired.

The several cases and their contents increase the weight of the cycle to a point where the hydraulic jacks are desirable, if not necessary, for holding the cycle upright.

The purpose of the cycle and its equipment is to permit rapid, and controlled, movement of a trained first aid or para-medic person and the tools and equipment which he is liable to need to the scene of an accident, over ground which cannot be traversed by a car due to traffic or absence of roads.

What is claimed to be new and what is desired to be secured by Letters Patent is:

1. A case assembly for emergency medical and rescue materials attachable over the rear wheel of a motorcycle comprising:

a first support panel arranged to be secured to support members of a cycle in transversely extending and laterally projecting relation over said rear wheel, other panels secured to and coacting with said first panel to define therewith a main top case and two side cases depending below said first panel and spaced laterally therealong to overlap the rear wheel of a cycle, doors hinged to said other panels to close the top of the top case and the laterally outer sides of said side cases, hydraulic cylinders secured in upright relation to the front side panels of said side cases and having extensible supporting feet on their lower ends, a pump and driving motor therefor secured to one of said panels and hydraulically connected to said cylinders, rearwardly facing standard signal and emergency signal lights mounted on said panels, and a multi-conductor terminal block on a forwardly facing panel of said cases and having exposed switch elements on its forward side connected to control the energization of said rearwardly facing signal lights and said motor from the battery of said cycle.

2. A case assembly as defined in claim 1 in which the front and rear panels of said cases are formed by continuous generally U-shaped panels.

3. A case assembly as defined in claim 2 in which the laterally inner ones of said other panels forming said side cases have laterally outwardly off-set lower portions which clear the exhaust pipes of said cycle.

4. A case assembly as defined in claim 2 in which the laterally inner ones of said other panels forming the inner walls of said side cases have brackets secured thereto and projecting forwardly therefrom and adapted to be secured to rear foot supporting brackets on said cycle.

5. A case assembly as defined in claim 1 in which part of said emergency lights are strobe lights, and a transformer for energizing said strobe lights mounted within one of said cases and electrically connected to said terminal block and a switch thereon.

6. A case assembly as defined in claim 1 in which there are upper side cases on the tops of said depending side cases and along the side walls of said main top case.

* * * * *